United States Patent [19]

Focoueur, Hervë et al.

[11] Patent Number: 5,083,980
[45] Date of Patent: Jan. 28, 1992

[54] VISCOUS TORSION DAMPER, PARTICULARLY FOR AN AUTOMOTIVE VEHICLE

[75] Inventors: Focoueur, Hervë, Franconville; Bernard Jumel, Paris, both of France

[73] Assignee: VALEO, Paris, France

[21] Appl. No.: 414,301

[22] Filed: Sep. 29, 1989

[30] Foreign Application Priority Data

Oct. 5, 1988 [FR] France .................. 88 13006

[51] Int. Cl.⁵ .......................................... F16F 15/16
[52] U.S. Cl. ................................ 464/24; 192/106.2; 464/68
[58] Field of Search ............ 192/58 B, 103 F, 106.1, 192/106.2; 464/24, 27, 68

[56] References Cited

U.S. PATENT DOCUMENTS

| | | | |
|---|---|---|---|
| 3,223,214 | 12/1965 | Kuivinen | 464/68 X |
| 3,534,841 | 10/1970 | Schneider et al. | 464/68 X |
| 4,351,167 | 9/1982 | Hanke et al. | 464/24 |
| 4,565,273 | 1/1986 | Tojima et al. | 192/106.2 |
| 4,669,592 | 6/1987 | Alas et al. | 192/106.2 |
| 4,775,042 | 10/1988 | Kohno et al. | 464/24 X |
| 4,777,843 | 10/1988 | Bopp | 192/106.2 X |
| 4,828,533 | 5/1989 | Focqueur et al. | 464/24 |
| 4,856,636 | 8/1989 | Meinhard | 464/68 X |
| 4,874,074 | 10/1989 | Damon et al. | 464/24 X |

FOREIGN PATENT DOCUMENTS

| | | |
|---|---|---|
| 3442738 | 6/1985 | Fed. Rep. of Germany . |
| 1375156 | 9/1964 | France . |
| 2256348 | 7/1975 | France . |
| 2576985 | 8/1986 | France . |
| 2597181 | 10/1987 | France . |
| 2626336 | 7/1989 | France . |
| 2197050 | 5/1988 | United Kingdom . |

Primary Examiner—Daniel P. Stodola
Attorney, Agent, or Firm—Longacre & White

[57] ABSTRACT

A torsion damper for a friction clutch and/or a double damped flywheel of an automotive vehicle is of the kind having a viscous damper of the type in which two cooperating sets of vanes or fins are associated respectively with an inner and an outer carrying element. An obturator is mounted for radial sliding movement in an open chamber formed in each of the fins forming part of the inner carrying element. The obturator comprises a head block which is mounted for movement with a plunger that extends through a collar. The plunger is under the influence of a return spring, one end of which bears on the collar, with the other end bearing on an end stop fixed to the plunger. The arrangement is such that the obturator is radially moveable between a rest position in which it is in engagement on the collar, and an obturating position in which it closes off the passage between the associated fin and the outer carrying element.

10 Claims, 3 Drawing Sheets

VISCOUS TORSION DAMPER, PARTICULARLY FOR AN AUTOMOTIVE VEHICLE

FIELD OF THE INVENTION

This invention relates to torsion dampers. It is specifically concerned with torsion dampers, particularly for automotive vehicles, of the kind comprising: at least two coaxial parts, mounted for relative rotation one with respect to the other; resilient means, operatively interposed between the two coaxial parts; and a viscous damping means having calibrated passages interposed between the relatively rotatable parts and confined within the interior of a cavity, the said viscous damping means comprising within the cavity two groups of fins, each group of fins being rotatable with a respective one of the relatively rotatable parts, the fins extending generally in radial planes and each fin being attached to a carrying element, comprising an inner carrying element disposed within the other which is an outer carrying element, with any one fin of a group being interposed circumferentially between two fins of the other group.

BACKGROUND OF THE INVENTION

A torsion damper of the kind described above (which will be referred to herein as a torsion damper of the kind specified) is described in French published Patent Application No. 2 597 181, in which one of the relatively moveable parts is adapted to be coupled with the driving shaft and the other with the driven shaft, in each case for rotation with the appropriate shaft, and the cavity is filled with fluid. Calibrated passages are provided, especially between the free end of a fin of one group and the carrying element associated with the fins of the other group. In order to reduce the damping effect when the engine is in a decelerating mode with the gearbox on dead centre, it is possible to use an arrangement of the same kind as that which is described in French published Patent Application No. 1 375 156, in which the dimensions of a transfer passage vary under the action of a progressively acting obturator which is incorporated in the fins or vanes associated with the outer carrying element. This obturator is in the form of a plunger, and is acted on by a return spring. The plunger extends through a transfer passage located at the foot of the appropriate vane. Such an arrangement is comparatively expensive, because, not only must the obturator be made to fit accurately, but also the manufacture of the transfer passages is a somewhat delicate operation. In addition, high precision calibrated passages exist in the vicinity of the free ends of the fins associated with the inner carrying element.

SUMMARY OF THE INVENTION

An object of the present invention is to overcome these disadvantages, and thus to provide a viscous damping means in which manufacturing tolerances may be made less precise, while at the same time improving the damping effect and obtaining further advantages.

In accordance with the invention, a torsion damper of the kind specified, in which the cavity is partially filled with a fluid, is characterised in that: (a) at least one obturator extends slidingly within a chamber which extends towards the outer carrying element, this chamber being open towards the latter and being formed in a fin associated with the inner carrying element; and (b) the said obturator comprises a head block, fixed with respect to a plunger which extends through a collar, the plunger being subject to the action of a return spring biassing the obturator away from the outer carrying element, with the return spring bearing on the collar and on an end stop which is fixed to the plunger, the arrangement being such that the obturator is radially moveable between a rest position in which it engages on the collar and an obturating position in which it obturates the passage between the corresponding fin and the outer carrying element.

In such a damper according to the invention, the fins associated with the outer carrying element are solid, so that in order to obtain the required balance, it is possible to reduce both the size of these fins and the inertia of the assembly. In addition, the distance between the outer carrying element and the inner fins does not need to be accurately controlled.

It will be noted that the outer carrying element, by contrast with the arrangement disclosed in the above mentioned French published Patent Application No. 1 375 156, is not affected by the obturator, so that the outer carrying element can easily be fixed to one of the two relatively rotatable parts of the damper. This arrangement is also especially advantageous when it is applied to a double damped flywheel, of the kind which is for example described in French published Patent Application No. 2 626 336 (corresponding to U.S. Patent application Ser. No. 300,840, now U.S. Pat. No. 4,903,544).

In addition, the mounting of the obturator, and its handling during manufacture, are simple, because all that is necessary to assemble it in position is to push the plunger into the open chamber which is formed for it in the appropriate fin.

It will be appreciated that the invention makes it possible to reconcile two situations which would at first sight appear mutually contradictory, namely that of a reduced need for accurate component manufacture on the one hand, and improved damping on the other.

When the engine is in its decelerating mode, the passages between the extremities of the inner fins and the outer carrying element are at their maximum size, damping being at the same time minimal; while from the instant at which certain operating criteria, predetermined by the return springs, are satisfied, the head blocks of the obturators progressively move closer to the outer carrying element until they come into contact with the latter. At this point, damping is at its maximum.

According to a major feature of the invention, the block is of plastics material and is mounted in a head portion of the metal plunger, the plunger head portion being of greater width than the remainder of the plunger. This enables the obturator to be of sufficient mass to operate in an optimal manner and to be sufficiently sensitive to centrifugal force. The arrangement also makes it possible to choose for the head blocks the most suitable material, such that friction between the outer carrying element and the head blocks shall be adequate while yet being as small as possible. Due to the head blocks, it is possible to minimise hysteresis effects, while achieving reliable operation of the damper and a long service life, this reliability being evident even after the vehicle has been out of use for a long time.

The description which follows illustrates the invention, by way of example only, with reference to the accompanying drawings.

DESCRIPTION OF PREFERRED EMBODIMENT OF THE INVENTION

Figure 1:
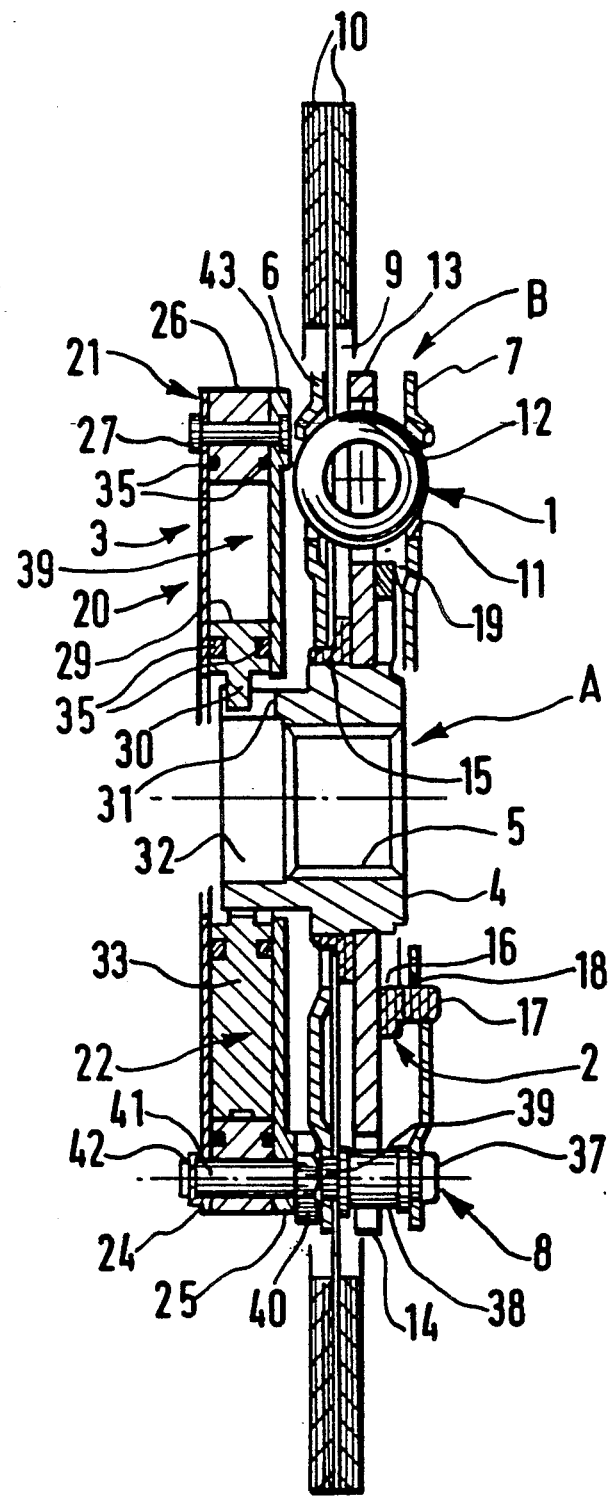
FIG. 1 is a view in axial cross section of a torsion damper taken on the line I—I in FIG. 2.

The embodiment of the torsion damper which is now to be described is a friction clutch for an automotive vehicle. This clutch comprises: two coaxial parts A and B, which are mounted so as to be moveable with respect to each other within the limits of a predetermined relative angular displacement and against the action of resilient means 1; dry friction damping means 2; and a fluid damping means 3 interposed between the two relatively moveable parts A and B.

The part A includes a hub 4, having an internal bore 5 which is splined for engagement, in common rotation, with the input shaft of the gearbox. The part B includes two guide rings 6 and 7 which are connected to each other, and spaced apart, by means of spacer bars 8. The guide rings 6 and 7 are mounted around the hub 4 for free rotation thereon.

The guide ring 6 carries a disc 9 which is provided with friction pads 10 and which is connected to the guide rings 6 and 7 by means of the spacer bars 8. The guide rings 6 and 7 are able to be coupled with the engine crankshaft, for rotation with the latter, when the friction pads 10 are gripped between a pressure plate and a reaction plate (not shown) of the clutch.

The guide rings 6 and 7 are provided with openings 11, which in this example are in the form of windows and in which the circumferentially acting resilient means 1, here taking the form of coil springs, are partly mounted. The springs 1 are also partly mounted in further windows 12 which are in register with the windows 11. The windows 12 are formed in a damper plate 3, which is secured to the hub 4 by crimping or otherwise. In this way the springs 1 are operatively interposed between the two relatively moveable parts A and B of the damper. They are for example mounted in such a way that they have no clearance in the windows 11, while a clearance exists or can develop in the windows 12. The damper plate 13 is disposed axially between the guide rings 6 and 7, and is provided with slots 14 through which the spacer bars 8 extend.

A centering bearing ring 15, of L-shaped cross section, is inserted so as to extend in the axial direction between the damper plate 13 and the disc 9, in such a way that it overlaps the guide ring 6. In the radial direction, it extends between the outer periphery of the hub 4 and the bore of the guide ring 6. The bearing ring 15 engages the guide ring 6 sufficiently closely to be coupled with the latter for rotation with it. A friction ring 16 is also inserted axially between the damper plate 13 and the other guide ring 7. The friction ring 16 is preferably made of a plastics material, and is furnished with pins 17 which are engaged in corresponding holes 18 formed in the guide ring 7, so as to couple the rings 7 and 16 together for common rotation. A resilient ring 19, which in this example is a Belleville ring, bears against the guide ring 7, and biasses the friction ring 16 towards the damper plate 13. The dry friction damping means 2 consists of the friction ring 16 and the parts operatively associated with it.

As to the viscous damping means 3, this is arranged outside the space bounded by the guide rings 6 and 7. The viscous damping means 3 is arranged within a sealed housing 20, which defines a cavity 39 having two portions 21 and 22 which are moveable in relation to each other. Engagement means, for effecting coupling in simultaneous rotation, are provided firstly between one of the housing portions 21 and 22 and that part of the damper which is not coupled for rotation with the hub, and secondly between the hub 4 and the other housing portion 22 or 21. At least one of these engagement means also provides axial connection in a manner to be described below.

Figure 2:
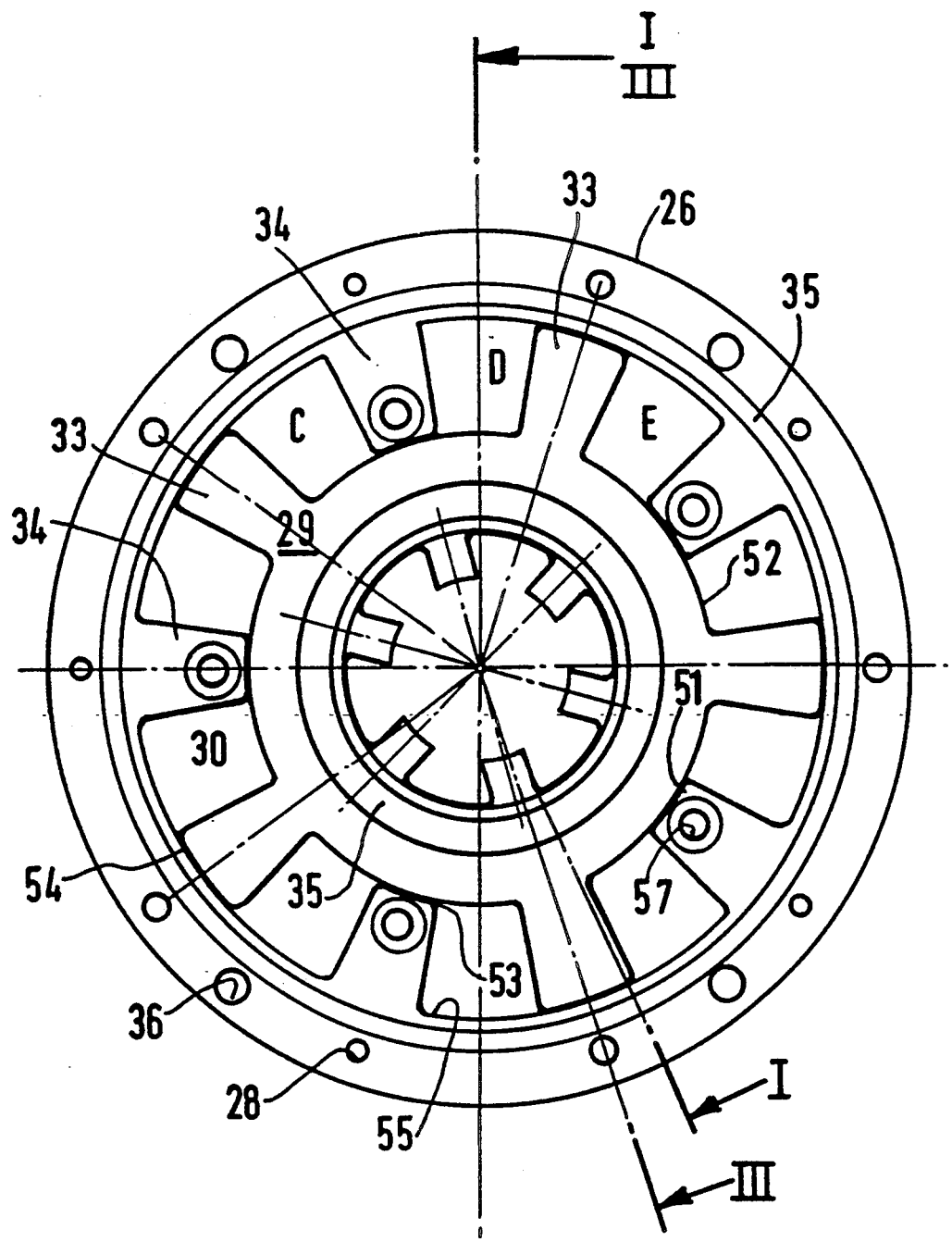
FIG. 2 is a front view of the viscous damping means, with one of its face plates removed.

The housing 20 comprises two face plates 24 and 25, which are maintained at a fixed axial spacing from each other by means of an annular spacer or carrying ring 26. The face plates 24 and 25 and the spacer ring 26 are secured together by rivets 27 extending through all three components. Referring to FIG. 2, the spacer ring 26 is formed with a number of holes 28 through which the rivets 27 extend. The viscous damping means 3 has a radial dimension, defined by the housing 20, which is greater than the radius at which the springs 1 are mounted, so that the housing 20 defines a relatively large circumference. All these components of the viscous damping means so far mentioned are relevant to the housing portion 21.

The other housing portion 22 comprises, at the inner periphery of the face plates 24 and 25, an annular inner carrying element 29, again in the form of a spacer ring, which is interposed between the face plates 24 and 25 and which has teeth 30, spaced apart uniformly along its inner periphery. The teeth 30 extend without clearance, each into a complementary slot 31 formed in an axial extension 32 of the hub 4. The teeth 30 and their slots 31 constitute engagement means for coupling the housing portion 22 with the hub 4 for common rotation.

The inner carrying ring 29 has radial fins 33, which extend radially outwardly towards the spacer or carrying ring 26, while the latter has fins 34, extending radially inwardly towards the carrying ring 29. The spacer ring 26 thus constitutes an external carrying ring, i.e. a carrier for the fins 34. Each of the fins 33 and 34 is generally trapezoidal in shape, the fins forming two groups which are mounted in head to toe relationship and which extend generally in the radial planes extending through the common axis. Any one fin of one of these groups is circumferentially interposed between two fins of the other group.

Sealing joints 35 are provided for sealing the housing 20. Calibrated passages are provided between consecutive fins 33, 34, and the housing 20 is partially filled with a suitable damping fluid, such as a silicone. In addition, the outer spacer ring 26 has holes 36 to allow the spacer bars 8 to extend through it.

Each spacer bar 8 has a head 37 joined to a first shank portion 38, the diameter of which is greater than that of the head 37 so as to maintain the axial distance between the two guide rings 6 and 7, a threaded portion 39 of reduced diameter, on which a nut 40 is secured so as to fasten the guide rings 6 and 7, and a cylindrical second shank portion 41 which extends through the face plates 24 and 25 and the hole 36, to terminate in an end portion which is provided with a groove. A circlip 42 is fitted in this groove and bears against the face plate 24. In this way the housing 20 is coupled with the guide rings 6 and 7 for rotation with them. The housing 20 is coupled axially with the guide rings by virtue of the fact that the housing 20 is trapped between the nuts 40 and the circlips 42, the face plate 25 having a plurality of portions 43 of increased thickness for cooperation with the nuts 40. The engagement means between the housing portion 21 and the guide rings 6 and 7 comprise the spacer bars 8 and the other components operatively associated with them.

Figure 3:
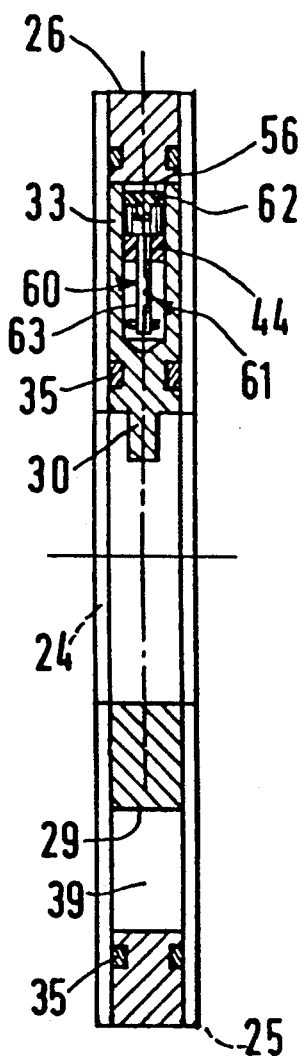
FIG. 3 is a view in cross section, taken on the line III—III in FIG. 2, but with the face plates of the viscous damping means not shown in cross section.
Figure 4:
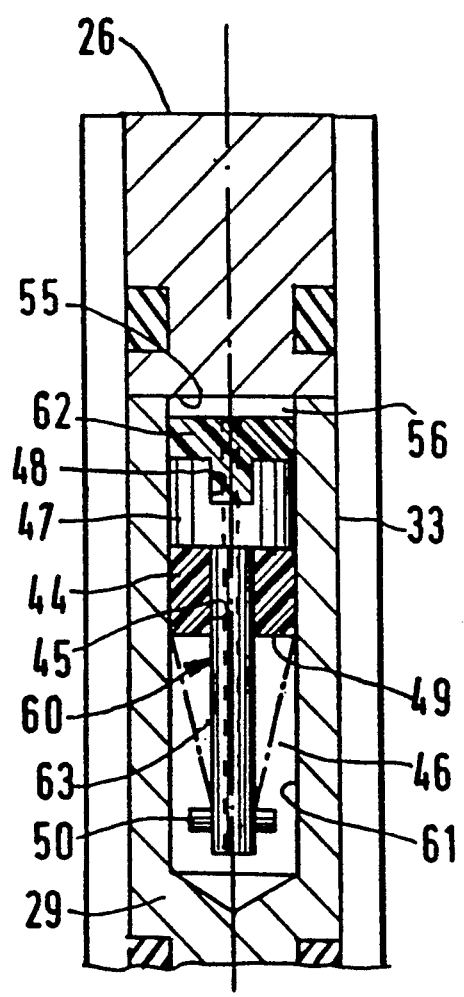
FIG. 4 is a view on a larger scale of the obturating member seen in FIG. 2, here shown in a rest position.

Reference is now made to FIGS. 3 and 4, which show an obturator 60. This is mounted in at least one of the fins 33, which will be referred to as internal fins, of the inner carrying element 29. The obturator 60 is mounted in a chamber 61 which is open towards the outer carrying element 26. In this example the chamber 61 is in the form of a blind hole formed in the inner fin 33 shown. For the purposes of this example, one obturator is associated with each of the fins 33.

The obturator includes a head block 62 which is fixed to a metal plunger 63, which passes through a hole 45 formed in a guide collar 44. The obturator plunger 63 is subjected to the action of a return spring 46 which biasses the obturator away from the outer carrier ring 26. The spring 46 engages on the collar 44 and on an end stop 50 which is secured to the plunger 63. In this example, the head block 62 is annular in shape and is preferably made of a plastics material reinforced by suitable fibres, and is generally T-shaped in axial cross section. The head block 62 is engaged in an enlarged head portion 47 of the plunger 63, for which purpose the head portion 47 has a central cavity 48 to receive the centrally projecting part of the head block 62. In the rest or waiting position, the plunger head portion 47 bears against the upper face of the collar 44. The head block 62 may have a diameter which is slightly greater than that of the plunger head portion 47, in order that the head block 62 is in preferential frictional engagement against the inner surface of the chamber 61.

As indicated diagrammatically in FIG. 4, the return spring 46 is preferably frusto-conical in form. It engages on the lower face 49 of the collar 44, while in this example the end stop 50, inserted through the lower end of the plunger 63 and against which the lower end of the spring 46 engages, is a transverse cotter. In a modification, this end stop may comprise a resilient crown ring, force fitted on the plunger 63. The collar 44 is preferably made of plastics material, and in this non-limiting example it is annular in shape.

In operation, when the damper part B is displaced with respect to the part A, the outer carrying element 26, which is fixed with respect to the part B, is displaced in relation to the inner carrying element 29, in such a way that, considering the chambers C, D and E shown in FIG. 2 and defined between two consecutive fins 33, then in one given direction of rotation, for example, one of the chambers D becomes reduced in volume while the other chambers C and E become enlarged.

The free edges 51 of the outer fins 34 are of course carefully spaced from the outer surface 52 of the inner carrying element 29, to define a calibrated passage 53. However, no calibrated passage is necessary between the free edges 54 of the inner fins 33 and the outer carrying ring 26. Narrow passages are defined both between the inner fins 33 and the face plates 24 and 25, and between the outer fins 34 and the face plates. These narrow passages and calibrated passage 53 together define a calibrated passage means between two consecutive fins 33 and 34.

Thus, a quantity of air is initially transferred through the passages 53, while the head blocks 62 are spaced away from the inner face 55 of the outer spacer or carrying ring 26. A relatively large passage 56 then exists between each head block 62 and the outer spacer ring 26. In a second stage of operation, the viscous damping takes increasing effect, with the chamber D becoming completely full following a relative angular displacement between the fins 33 and the fins 34. Beyond a certain speed, which is determined by the return spring 46, the head blocks 62, under the action of centrifugal force, come progressively nearer to the outer spacer ring 26, until they actually make contact with its face 55. In this position the passages 56 are obturated, and the calibrated passage means, mentioned above, between two fins 33 and 34 then consists mainly of the passage 53.

With the arrangement described above, damping can be made to be minimal while the engine is decelerating, and then to increase. It will be appreciated that in the decelerating mode, parasitic friction in the region of the inner face 55 of the outer carrying ring is virtually nil, but that friction can take place in the region of the outer face 52 of the inner carrying ring, which is at a small radius.

It will be clear from this description that the head block 62 is so mounted in its chamber 61 that it can freely slide therein. In order to maintain suitably narrow passages between the fins 33, 34 and the face plates 24 and 25, while avoiding opening of these passages at their inner periphery, it is possible to connect the face plates 24 and 25 together, for example by means of rivets similar to the rivet 27. For this purpose, holes shown at 57 in FIG. 2 may be formed in the fins 34 close to the inner carrying element 29.

The obturator 60 constitutes, with its collar 44, an assembly which is easily handled, and easily mounted in its chamber 61 by simple insertion until the collar 44 reaches its required position. The distance through which the collar needs to be pushed to reach this position may be dependent on the length of the obturator 60 for example, and determined by bringing the plunger 63 into engagement with the bottom of the chamber 61, with the collar 44 being force fitted in the chamber 61. To this end it preferably has a diameter which is greater than that of the plunger head 47 and of the head block 62.

The collar 44 can be made of a material different from that of the head block 62, and such as to enable the plunger 63 to slide easily in it under all conditions. In combination with the material of the head block 62, it is thus possible to eliminate any risk of jamming.

In a modification, the collar 44 may be provided with projecting lips, for example one upper and one lower lip, being then forced into the chamber until the lips extend into grooves provided for this purpose in the wall of the chamber, in such a position as to maintain the plunger 63 at a distance spaced from the bottom of the chamber 61. As will be clearly understood, the plunger 63 and the head block 62 are both made hollow, so as to define a passage for equalising the pressure between the two halves of the housing chamber 61 which exist on either side of the head block 62 when the engine is in a decelerating mode.

The present invention is of course not limited to the embodiments described. For example, the outer carrying element may be a separate member from the spacer ring 26, and is then mounted on the latter and secured to it.

The viscous damping means may be mounted in a double damped flywheel, as described in French published Patent Applications Nos. 2 626 337 and 2 626 336 (corresponding to U.S. patent application Ser. No. 300,840). It may be provided with shock absorbing means, as described in the above mentioned French published Patent Application No. 2 626 337. It may also be mounted between the guide rings, in the manner described in United Kingdom published Patent Application No. 2 197 050. The viscous damping means 3 may be associated with resilient means comprising a disc of elastomeric material, as described in French published Patent Application No. 2 597 181.

Again, the guide rings 6 and 7 may be fixed with respect to the hub 4, and the damper plate 13 may be mounted freely on the hub 4. In this case, the spacer bars 8 would be secured with respect to the damper plate 13, with the viscous damping means 3 still arranged outside the space bounded by the guide rings 6 and 7, and with its inner carrying ring 29 fixed with respect to the hub 4 for common rotation with the latter. In all cases, the viscous damping means is in the form of a cassette, mounted on a standard torsion damper, and can extend over a large circumference radially outwardly of the springs 1, and this increases the damping effect and allows fins of substantial length to be provided.

Finally, depending on the degree of damping required, it is possible to avoid having to provide an obturator 60 in association with every one of the fins 33. For example, with six fins 33 there may be no more than three obturators. The inner carrying element 29 may be able to be secured to the hub 4 for rotation therewith, after a clearance has been taken up, this clearance being provided for example between the teeth 30 and the slots 31, while in FIG. 1 the damper plate 13 may be fixed with respect to the hub 4 for rotation therewith after a clearance has been taken up, in the manner described in French Patent No. 2 560 328 corresponding to U.S. Pat. No. 4,669,592.

The obturator could be cylindrical, with for example both it and the chamber 61 having a square axial cross section. Alternatively, they may be of polygonal shape.

What is claimed is:

1. A torsion damper comprising: at least two coaxial parts;
   means mounting said coaxial parts for relative rotation with respect to each other;
   resilient means operatively interposed between said coaxial parts; and
   viscous damping means comprising a housing defining a cavity therein to be partially filled with a damping fluid, an outer carrying element defining an outer portion of said housing, means coupling said outer carrying element to one of said coaxial parts, an inner carrying element radially inward of said outer carrying element, means coupling said inner carrying element to the other of said coaxial parts so as to impart the relative rotation between said carrying elements, two groups of radial fins within said cavity, with each group projecting from a respective one of said carrying elements and extending toward the other carrying element, the fins and the cavity together defining calibrated passage means between said coaxial parts and within the cavity including a passage between a free end of each fin of the inner carrying element and an adjacent surface of the outer carrying element, each fin of a group being interposed circumferentially between two fins of the other group, and at least one obturator carried by a respective fin of the group of fins projecting from the inner carrying element,
   wherein each fin having an obturator is formed with a chamber extending generally radially and open towards the outer carrying element, said fin having an obturator further comprising a guide collar fitted in said chamber, the obturator comprising a head block and a plunger fixed to the head block, the plunger extending through the collar, the obturator being slidable in the chamber, end stop means fixed to the plunger, and a return spring engaging between the end stop means and the collar to bias the obturator away from the outer carrying element, whereby the obturator is movable against the return spring between a rest postion and an obturating position in which it obturates the associated said passage.

2. A damper according to claim 1, wherein the plunger has an enlarged head portion, with the head block being of plastics material and mounted within said head portion, and the plunger being of metallic material.

3. A damper according to claim 2, wherein the head block is annular and has a diameter which is slightly greater than that of said head portion of the plunger.

4. A damper according to claim 2, wherein the head block is of T-shaped cross section defining an axially extending portion thereof, and the head portion of the plunger has an opening for receiving said axially extending portion of the head block.

5. A damper according to claim 2, wherein the collar and the head block are annular, and the collar has a greater diameter than the head block.

6. A damper according to claim 5, wherein the collar is of a different material from the head block.

7. A damper according to claim 1, wherein the collar is of plastics material.

8. A damper according to claim 1, wherein said chamber comprises a blind hole, said return spring bears on a radially inner face of the collar, and, at its radially inner end, on said end stop of the plunger.

9. A damper according to claim 8, wherein the return spring is frusto-conical in form, with its radially inner end being its narrower end, and the end stop means is a cotter extending through a radially innermost end portion of the plunger.

10. A damper according to claim 1, wherein the plunger and the head block are hollow whereby to define a pressure equalisation passage.

* * * * *